US010482307B2

(12) United States Patent
Riedijk et al.

(10) Patent No.: US 10,482,307 B2
(45) Date of Patent: *Nov. 19, 2019

(54) FINGERPRINT SENSING SYSTEM AND METHOD UTILIZING EDGE-COMPENSATING STRUCTURE

(71) Applicant: Fingerprint Cards AB, Göteborg (SE)

(72) Inventors: Frank Riedijk, Delft (NL); Wouter Brevet, Delft (NL)

(73) Assignee: Fingerprint Cards AB, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/141,368

(22) Filed: Sep. 25, 2018

(65) Prior Publication Data
US 2019/0197283 A1   Jun. 27, 2019

(30) Foreign Application Priority Data

Dec. 21, 2017   (SE) .................................... 17516048

(51) Int. Cl.
*G06K 9/00* (2006.01)
*G06K 9/28* (2006.01)
*G06F 21/32* (2013.01)

(52) U.S. Cl.
CPC ............ *G06K 9/0002* (2013.01); *G06F 21/32* (2013.01); *G06K 9/00053* (2013.01); *G06K 9/28* (2013.01)

(58) Field of Classification Search
None
See application file for complete search history.

(56) References Cited

U.S. PATENT DOCUMENTS

| 5,736,732 | A | 4/1998 | Possin et al. | |
|---|---|---|---|---|
| 7,864,992 | B2 | 1/2011 | Riedijk et al. | |
| 9,152,841 | B1* | 10/2015 | Riedijk | G06K 9/0002 |
| 9,383,876 | B2* | 7/2016 | Riedijk | G06F 3/044 |
| 9,773,153 | B1* | 9/2017 | Slottner | G06K 9/00053 |
| 2006/0076963 | A1* | 4/2006 | Miyasaka | G06K 9/0002 324/662 |
| 2006/0153431 | A1 | 7/2006 | Ando | |

(Continued)

FOREIGN PATENT DOCUMENTS

EP          0999596 A2    5/2000

OTHER PUBLICATIONS

Swedish Search Report for SE Application No. 1751604-8 dated Aug. 29, 2018, 2 pages.

(Continued)

*Primary Examiner* — Tahmina N Ansari
(74) *Attorney, Agent, or Firm* — RMCK Law Group, PLC

(57) ABSTRACT

A fingerprint sensing system for sensing a fingerprint pattern of a finger, comprising: a sensor array including a plurality of electrically conductive sensing structures; read-out circuitry connected to each of the sensing structures for providing sensing signals indicative of a capacitive coupling between the sensing structures and the finger; first signal providing circuitry for providing a first time-varying voltage signal to at least a portion of the sensor array; at least one electrically conductive edge-compensating structure arranged outside the sensor array; and second signal providing circuitry for providing a second time-varying voltage signal to the at least one edge-compensating structure.

16 Claims, 8 Drawing Sheets

(56) References Cited

U.S. PATENT DOCUMENTS

2010/0141380 A1* 6/2010 Pishva ................ G06K 9/0012
340/5.2
2016/0092713 A1 3/2016 Wu et al.

OTHER PUBLICATIONS

Extended European Search Report dated Mar. 28, 2019 for EP Application No. 18194239.2, 9 pages.

* cited by examiner

FINGERPRINT SENSING SYSTEM AND METHOD UTILIZING EDGE-COMPENSATING STRUCTURE

CROSS REFERENCE TO RELATED APPLICATIONS

This application claims priority to Sweden Application No. 1751604-8 filed on Dec. 21, 2017, the disclosure of which is incorporated herein by reference in its entirety.

FIELD OF THE INVENTION

The present invention relates to a fingerprint sensing system and to a method of sensing a fingerprint pattern of a finger.

BACKGROUND OF THE INVENTION

Various types of biometric systems are used more and more in order to provide for increased security and/or enhanced user convenience.

In particular, fingerprint sensing systems have been adopted in, for example, consumer electronic devices, thanks to their small form factor, high performance and user acceptance.

Among the various available fingerprint sensing principles (such as capacitive, optical, acoustic, thermal etc), capacitive sensing is most commonly used, in particular in applications where size and power consumption are important issues.

Capacitive fingerprint sensors generally provide a measure indicative of the capacitance between each of several sensing structures and a finger placed on the surface of the fingerprint sensor.

U.S. Pat. No. 9,383,876 discloses a fingerprint sensing system comprising: a sensor array having a plurality of sensing structures; and read-out circuitry connected to each of the sensing structures for providing sensing signals; and power supply circuitry arranged to provide to the read-out circuitry a substantially constant supply voltage being a difference between a high driving voltage potential and a low driving voltage potential. The fingerprint sensing system according to U.S. Pat. No. 9,383,876 is configured in such a way that, during operation of the fingerprint sensing system, the low driving voltage potential and the high driving voltage potential oscillate in phase in relation to a reference potential of a device comprising the fingerprint sensing system, while substantially maintaining the supply voltage.

U.S. Pat. No. 9,152,841 discloses a fingerprint sensing system including excitation signal providing circuitry coupled to the sensing structure of each sensing element for changing a potential of the sensing structure, to thereby provide a change in potential difference between the finger and the sensing structure. Based on the output from the sensing elements when this change in potential difference is provided, a representation of the fingerprint pattern of the finger can be determined.

Although fingerprint systems such as those described above can achieve excellent fingerprint image quality, there is still room for improvement, in particular for very small fingerprint sensors.

SUMMARY

In view of the above, it is an object of the present invention to provide for further improved fingerprint sensing.

According to a first aspect of the present invention, it is therefore provided a fingerprint sensing system for sensing a fingerprint pattern of a finger, comprising: a sensor array including a plurality of electrically conductive sensing structures; read-out circuitry connected to each of the sensing structures for providing sensing signals indicative of a capacitive coupling between the sensing structures and the finger; first signal providing circuitry for providing a first time-varying voltage signal to at least a portion of the sensor array; at least one electrically conductive edge-compensating structure arranged outside the sensor array; and second signal providing circuitry for providing a second time-varying voltage signal to the at least one edge-compensating structure.

Each sensing structure in the plurality of electrically conductive sensing structures may advantageously be provided in the form of a metal plate, so that a kind of parallel plate capacitor is formed by the sensing structure (the metal plate), the local finger surface, and a dielectric structure covering the sensing structures (and any air that may locally exist between the local finger surface and the dielectric structure). Sensing structures at locations corresponding to ridges in the fingerprint will exhibit a stronger capacitive coupling to the finger than sensing structures at locations corresponding to valleys in the fingerprint.

The dielectric structure covering the sensing structures may advantageously include a protective dielectric coating that may be at least 20 µm thick and have a high dielectric strength to protect the underlying structures from wear and tear as well as ESD. Even more advantageously, the protective coating may be at least 50 µm thick. In embodiments, the dielectric structure covering the sensing structures may be several hundred µm thick. In such cases, the dielectric structure covering the sensing structures may, for example, include a cover glass of an electronic device.

The read-out circuitry may provide analog sensing signals, for example in the form of voltage levels or currents being indicative of the capacitive coupling between the finger and the sensing structures comprised in the sensor array.

According to various embodiments, however, the read-out circuitry may include circuitry for converting analog signals to digital signals. Such circuitry may include, for example, sampling circuitry and analog-to-digital conversion circuitry.

Either or both of the first signal providing circuitry and the second signal providing circuitry may be switching circuitry configured to switch between two or more different potentials provided on different lines. Alternatively or in combination, either or both of the first signal providing circuitry and the second signal providing circuitry may comprise at least one signal source configured to provide a time-varying potential, such as a square wave voltage signal or a sine wave voltage signal.

Furthermore, the first signal providing circuitry and the second signal providing circuitry may be provided as separate circuits, or as common circuitry connected to both the sensor array and/or the read-out circuitry and the edge-compensating structure arranged outside the sensor array.

It should be noted that the first time-varying voltage signal and the second time-varying voltage signal are both time-varying in relation to the same reference potential, such as a reference potential of a device comprising the fingerprint sensing system. Such a reference potential of the device may be referred to as "device ground". In some embodiments, the reference potential of the sensor array— "sensor ground"—may be constant in relation to the device grounds, and in other embodiments, the sensor ground may be time varying. In such embodiments, the first time-varying potential may be substantially constant in relation to the sensor ground (while being time-varying in relation to the device ground). Moreover, it should be noted that the potential of the finger may typically be at a substantially constant level, at least for the relevant time scale for fingerprint acquisition, in relation to the "device ground". For instance, the body of the user may actually define the "device ground" for a portable device that is not connected to some global reference potential (like mains ground). Such a portable device for which the body of the user may define the device ground may for example be a mobile communication device or a smart card etc.

The first time-varying voltage signal provided to at least a portion of the sensor array will result in a time-varying potential difference between at least one of the sensing structures and the finger. This time-varying potential difference enables the read-out circuitry to provide sensing signals indicating the capacitive coupling between each of the sensing structures and the finger.

The at least one edge-compensating structure may be any conductive structure arranged relatively close to sensing structures at an edge of the sensor array. For example, the at least one edge-compensating structure may be arranged less than 0.5 mm from an edge of the sensor array. Advantageously, the at least one edge-compensating structure may be arranged less than 0.1 mm from an edge of the sensor array (an edge of the closest sensing structure at an edge of the sensor array).

The total capacitive coupling that can be sensed for a sensing structure will not only depend on the local distance between the sensing structure and the finger, but also on other conductive structures in the vicinity of the sensing structure. As is, for example, described in U.S. Pat. No. 9,152,841, the contribution to the total capacitive coupling from adjacent sensing structures can be considerably reduced by controlling the potentials of the adjacent sensing structures to follow (vary together with) the potential of the presently active (in sensing mode) sensing structure(s). The sensing structures arranged at the edges of the sensor array are, however, not surrounded by adjacent sensing structures. This results in a stronger, and possibly non-uniform, capacitive coupling between the sensing structure and its surroundings than closer to the middle of the sensor array. This will influence the fingerprint image (or other representation) formed based on the sensing signals from the read-out circuitry. For relatively large fingerprint sensors, such influence may be ignored or adequately compensated through image processing or the like. For relatively small (and thus more cost-efficient) fingerprint sensors, it becomes more important that the fingerprint sensor can provide a good image quality for the entire area of the sensor array.

The present inventors have now realized that this edge effect can be significantly reduced by providing at least one electrically conductive edge-compensating structure outside the sensor array and providing a suitable time-varying voltage signal to the at least one edge-compensating structure.

According to various embodiments, the second signal providing circuitry may advantageously be configured to provide the second time-varying voltage signal in synchronization with the first time-varying voltage signal. The second time-varying voltage signal may, for example, advantageously be substantially in phase with the first time-varying voltage signal.

According to embodiments, the second time-varying voltage signal may advantageously be such that a potential difference between a sensing structure at an edge of the sensor array and an adjacent edge-compensating structure is kept substantially constant, at least at points in time that are relevant to the sensing of the capacitive coupling between the sensing structure and the finger. Hereby, the influence of parasitic capacitances to structures in the vicinity of the sensing structure can be significantly reduced.

Which points in time are relevant to the sensing may be different depending on the sensing method used, and the skilled person will be able to determine such points in time, for example based on circuit simulation, without undue burden. For example, in the case of so-called correlated double-sampling where the sensing signal is sampled at two sampling times, those sampling times may be the points in time that are relevant to the sensing.

According to embodiments, the read-out circuitry may comprise: a plurality of sensing circuits, each sensing circuit in the plurality of sensing circuits being arranged underneath, and being connected to, a respective set of sensing structures in the plurality of sensing structures; and signal routing and conditioning circuitry for routing and/or conditioning signals to and/or from the plurality of sensing circuits. The signal routing and conditioning circuitry may be at least partly arranged underneath the at least one edge compensating structure.

The above-mentioned signal routing and conditioning circuitry may, for example, include signal lines for control signals to the sensing circuitry, signal lines for status signals and sensing signals from the sensing circuits, amplifiers, samplers, multiplexers, analog-to-digital conversion circuitry, digital control logic, memory, and/or interface circuitry, etc.

In these embodiments, the desired edge-compensation can be achieved while substantially only using sensor real estate that is already used for other functionality. This means that the desired edge-compensation can be achieved with substantially no added cost of the fingerprint sensing system.

In embodiments, the above-mentioned set of sensing structures may be a single sensing structure, such that each sensing structure has a dedicated sensing circuit. In other embodiments, the above-mentioned set of sensing structures may include a plurality of sensing structures, such as four or eight sensing structures, and each sensing circuit may be connected to its sensing structures in sequence.

In embodiments of the fingerprint sensing system according to the present invention, the sensor array, the read-out circuitry, and the at least one edge-compensating structure may advantageously be included in a fingerprint sensor component.

In these embodiments, the fingerprint sensor component may comprise a component substrate; active circuitry formed on the component substrate; and a plurality of metal layers on the active circuitry.

The component substrate may advantageously be a semiconductor substrate such as a silicon substrate, and the active circuitry may be formed on the substrate by various process, including p-doping and/or n-doping and applying conductive layers.

Alternatively, the component substrate could be an insulating substrate. In such embodiments, the active circuitry could be formed using thin-film technology.

The above-mentioned metal layers on the active circuitry may be separated by insulating layers sandwiched between the metal layers. To achieve electrical contact between different metal layers at selected locations, interconnects may be provided using, per se, well-known techniques.

In embodiments, the plurality of sensing structures and the at least one edge-compensating structure may advantageously be formed in a top-most metal layer in the plurality of metal layers. Alternatively, the at least one edge-compensating structure may be provided on top of an insulating layer covering the sensing structure, using post-processing, which may for example take place during packaging of the fingerprint sensor component.

According to various embodiments, furthermore, the sensing structures in the plurality of sensing structures of the sensor array may be arranged in rows and columns; and the fingerprint sensing system may comprise a plurality of edge-compensating structures, including: a plurality of left proximal edge-compensating structures, each being arranged to the left of a corresponding one of the rows; and a plurality of right proximal edge-compensating structures, each being arranged to the right of a corresponding one of the rows. Each left proximal edge-compensating structure may be substantially aligned with its corresponding row of sensing structures, and each right proximal edge-compensating structure may be substantially aligned with its corresponding row of sensing structures.

It should be noted that the terms "rows" and "columns" used herein do not specify the dimension or orientation of the sensor array. Rows may include the same number, more or fewer sensing structures than columns. All rows/columns do not need to include the same number of sensing structures, although this is often the case.

The second signal providing circuitry may be connected to each of the left proximal edge-compensating structures, and to each of the right proximal edge-compensating structures, and the second signal providing circuitry may be controllable to provide the second time-varying voltage signal to a set of the left proximal edge-compensating structures, and/or to a set of the right proximal edge-compensating structures. The set(s) of proximal edge-compensating structures to which the second time-varying voltage signal is provided may be selected in view of the presently active sensing structure(s). If, for instance, all sensing structures in a given row of sensing structures are simultaneously being controlled to exhibit a time-varying potential, then at least a left proximal edge-compensating structure and a right proximal edge-compensating structure substantially aligned with the row of sensing structures may selectively be provided with second time-varying voltage signal.

In embodiments, the plurality of edge-compensating structures may further include: a plurality of left distal edge-compensating structures, each being arranged to the left of a corresponding one of the left proximal edge-compensating structures; and a plurality of right distal edge-compensating structures, each being arranged to the right of a corresponding one of the right proximal edge-compensating structures.

The second signal providing circuitry may be connected to each of the left distal edge-compensating structures, and to each of the right distal edge-compensating structures, and controllable to provide a third time-varying voltage signal to a set of the left distal edge-compensating structures, and/or to a set of the right distal edge-compensating structures.

The third time-varying voltage signal may be identical to the second time-varying voltage signal. Advantageously, however, the amplitude of the third time-varying voltage signal may be higher than the amplitude of the second time-varying voltage signal.

In various embodiments of the fingerprint sensing system according to the present invention, the first signal providing circuitry may be controllable to provide the first time-varying voltage signal to a set of the sensing structures in the plurality of sensing structures.

To achieve this "swinging pixel" operation, the first signal providing circuitry may be connectable to each sensing structure, either directly or through a so-called virtually grounded amplifier configuration.

In the latter configuration, the read-out circuitry may comprise a plurality of sensing circuits, each sensing circuit in the plurality of sensing circuit being connected to, a respective set of sensing structures in the plurality of sensing structures; each sensing circuit in the plurality of sensing circuits may comprise an amplifier including a first input connected to the set of sensing structures, a second input, an output, a feedback capacitor between the first input and the output, the charge amplifier being configured in such a way that a change in potential at the second input result in a substantially identical change in potential at the first input; and the first signal providing circuitry may be connected to the second input.

The amplifier may advantageously be a so-called, per se known, charge amplifier.

The first signal providing circuitry may be configured to provide the first time-varying voltage to the second input, to thereby cause the potential of the sensing structure(s) in the set of sensing structures connected to the first input of the amplifier to vary in relation to the potential of the finger.

In embodiments, the fingerprint sensing system may comprise a semiconductor substrate; the amplifier may comprise a transistor formed in a well in the semiconductor substrate, the transistor having a gate constituting the first input, an interface between the well and the substrate is configured in such a way that current can be prevented from flowing between the well and the substrate; and the first signal providing circuitry is further connected to the well. In these embodiments, the influence on the sensing of a parasitic capacitance between the sensing structure(s) and the well can be reduced.

The semiconductor substrate may advantageously be a doped semiconductor substrate, and the well may be a portion of the substrate doped to opposite polarity with respect to the semiconductor substrate (if the semiconductor substrate is p-doped, the well may be n-doped, and if the semiconductor substrate is n-doped, the well may be p-doped. This is one way of achieving an interface between the well and the substrate that is configured in such a way that a current can be prevented from flowing between the well and the substrate. In particular, the well and the substrate may be kept at such electrical potentials that no current flows through the diode formed at the interface between the substrate and the well.

Alternatively, an insulating layer may be provided between the substrate and the well, for instance in the form of a thin layer of glass. Such an insulating layer will also prevent current from flowing between the well and the substrate.

In various embodiments of the fingerprint sensing system according to the present invention, the fingerprint sensing system may further comprise finger detecting circuitry connected to the at least one edge-compensating structure for providing a finger detection signal indicative of a capacitive coupling between the at least one edge-compensating structure and the finger.

According to a second aspect of the present invention, there is provided a method of sensing a fingerprint pattern of a finger, using a finger sensing system comprising a sensor array including a plurality of electrically conductive sensing structures; read-out circuitry connected to each of the sensing structures; first signal providing circuitry; at least one electrically conductive edge-compensating structure arranged outside the sensor array; and second signal providing circuitry, the method comprising the steps of: controlling the first signal providing circuitry to provide a first time-varying voltage signal to at least a portion of the sensor array; controlling the second signal providing circuitry to provide a second time-varying voltage signal to the at least one edge-compensating structure; and controlling the read-out circuitry to provide sensing signals indicative of a capacitive coupling between the sensing structures and the finger.

Further embodiments of, and effects obtained through this second aspect of the present invention are largely analogous to those described above for the first aspect of the invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the finger sensing system and method according to the present invention are mainly described with reference to a fingerprint sensing system in which the potential of a set of sensing structures is controlled to vary in relation to sensor ground, and sensor ground is constant in relation to device ground. In particular, examples are described in which all sensing elements/pixels in a row/column are read-out simultaneously. Furthermore, some illustrative examples of edge-compensating structures are presented.

It should be noted that this by no means limits the scope defined by the appended claims, which equally well includes, for example, fingerprint sensing systems in which a potential difference between sensing structures and finger is achieved by providing the fingerprint sensor component with a time-varying reference potential, in relation to device ground. Moreover, other sensing configurations may be used, in which, for example, other groups of sensing elements are read-out simultaneously, or sensing elements are read-out individually. Many other configurations of edge-compensating structure(s) are also possible.

Figure 1A:
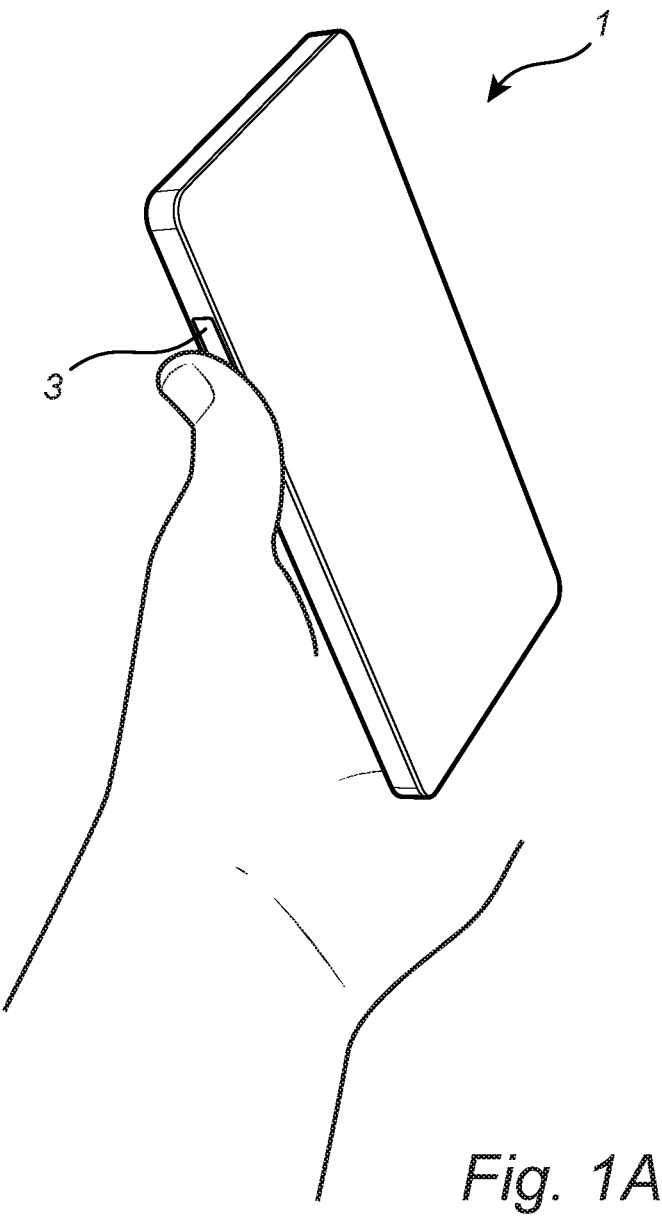
FIG. 1A schematically shows a mobile phone as a first example of an electronic device comprising a fingerprint sensing system according to embodiments of the present invention.

FIG. 1A schematically shows a mobile phone 1 as a first example of an electronic device comprising a fingerprint sensing system 3 according to embodiments of the present invention. The fingerprint sensing system 3 may, for example, be used for unlocking the mobile phone 1 and/or for authorizing transactions carried out using the mobile phone, etc.

Figure 1B:
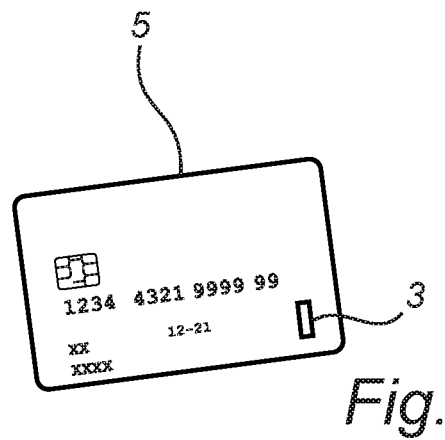
FIG. 1B schematically shows a smart card as a second example of an electronic device comprising a fingerprint sensing system according to embodiments of the present invention.

FIG. 1B schematically shows a smart card 5 as a second example of an electronic device comprising a fingerprint sensing system 3 according to embodiments of the present invention.

Figure 2A:
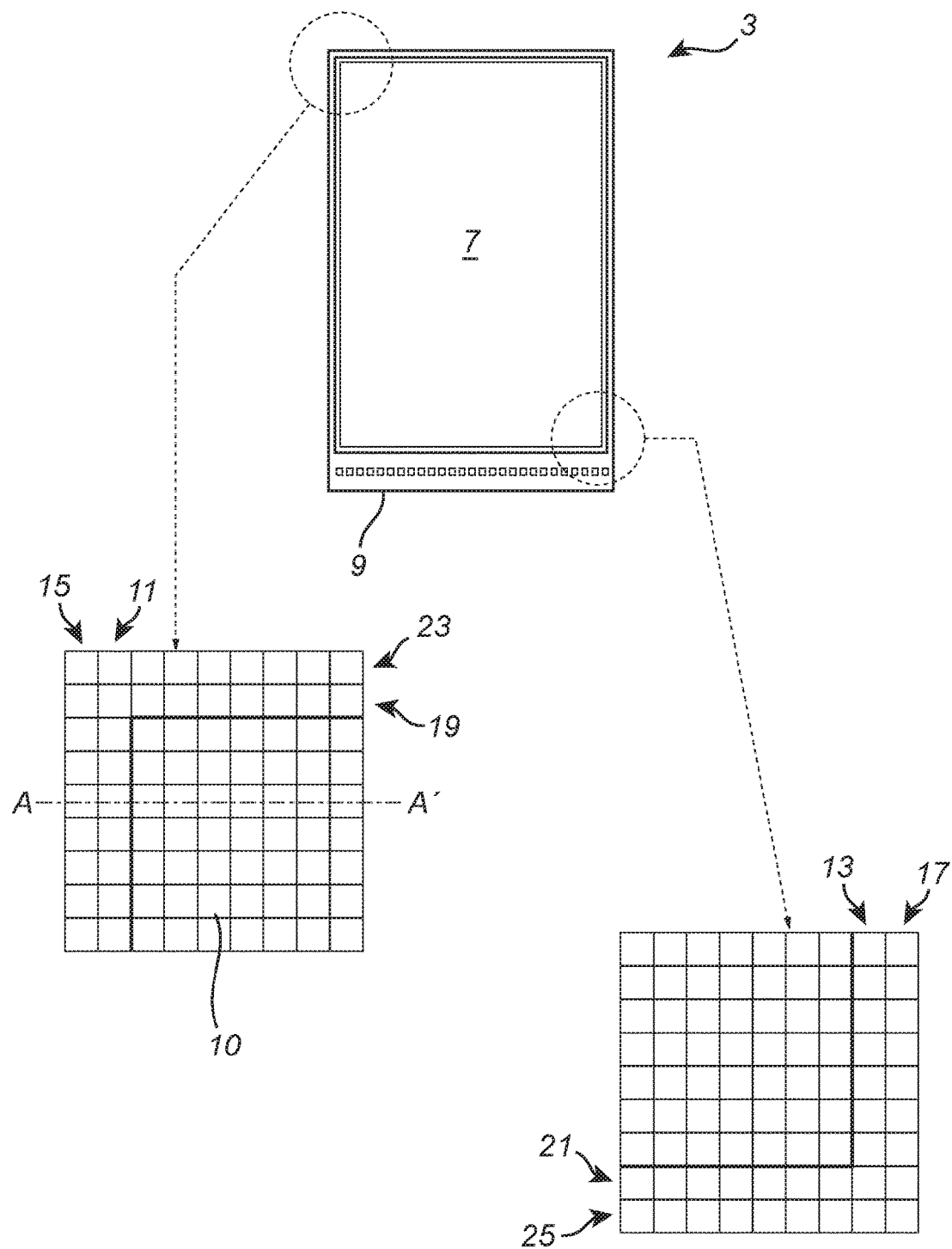
FIG. 2A schematically shows an example embodiment of the fingerprint sensing system according to the present invention, in the form of a semiconductor-based fingerprint sensor component.

FIG. 2A schematically shows an example embodiment of the fingerprint sensing system according to the present invention, in the form of a semiconductor-based fingerprint sensor 3. As can be seen in FIG. 2A, the fingerprint sensor 3 comprises a sensor array 7, and an interface 9 for receiving power for operation of the fingerprint sensor 3 and for interacting with processing circuitry comprised in the electronic device, such as the mobile phone 1 in FIG. 1A or the smart card 5 in FIG. 1B. The sensor array 7 comprises a large number of sensing structures 10 (only one of the sensing structures has been indicated with a reference numeral to avoid cluttering the drawing). As is schematically indicated in the enlarged illustrations of the fingerprint sensor 3 in FIG. 2A, the fingerprint sensor 3 further comprises edge-compensating structures, including left proximal edge-compensating structures 11, right proximal edge-compensating structures 13, left distal edge-compensating structures 15, right distal edge-compensating structures 17, top proximal edge-compensating structures 19, bottom proximal edge-compensating structures 21, top distal edge-compensating structures 23, and bottom distal edge-compensating structures 25.

Although not visible in FIG. 2A, the fingerprint sensor 3 further comprises read-out circuitry, first signal providing circuitry, and second signal providing circuitry. Examples of these parts of the fingerprint sensor 3 will be described further below with reference to FIG. 2B and FIG. 2C.

Figure 2B:
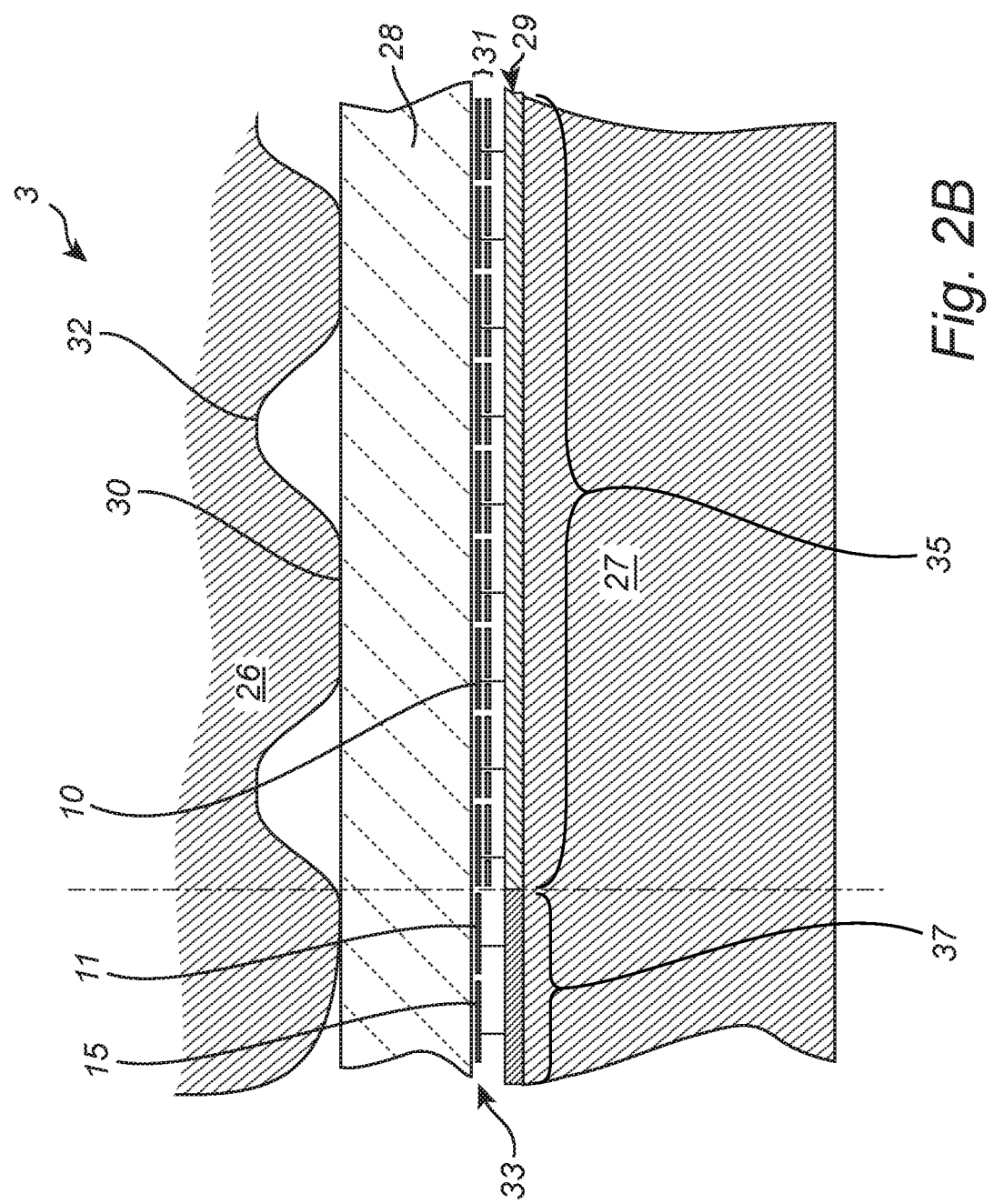
FIG. 2B is a schematic cross-section view of a portion of the fingerprint sensor component in FIG. 2A.

FIG. 2B is a schematic cross section of a portion of the fingerprint sensor 3 in FIG. 2A taken along the line A-A' as indicated in FIG. 2 with a finger 26 placed on top of a dielectric structure 28 covering the sensor array 7. The surface of the finger 26 comprises ridges 30 that are in contact with the dielectric structure 28 and valleys 32 that are spaced apart from the dielectric structure 28.

Referring to FIG. 2B, the fingerprint sensor 3 comprises a doped semiconductor component substrate 27, active circuitry 29 formed on the component substrate 27, and metal layers 31 on the active circuitry 27. The above-mentioned sensing structures 10, and the edge-compensation structures (a left proximal edge-compensating structure 11 and a left distal edge-compensating structure 15 are visible in FIG. 2B) are formed in the top-most metal layer 33. The above-mentioned read-out circuitry may at least partly be formed using the active circuitry 29. As is schematically indicated in FIG. 2B, a portion 35 of the active circuitry 29 underneath the sensing structures 10 may be used for forming sensing circuits for sensing a capacitive coupling between the sensing structures 10 and the finger 26. Another portion 37 of the active circuitry 29 underneath the edge-compensating structures 11, 15 may be used for forming signal routing and conditioning circuitry for routing and/or conditioning signals to and/or from said plurality of sensing circuits in the first portion 35 of the active circuitry 29.

By co-locating the edge-compensating structures 11, 15, and the signal routing and conditioning circuitry etc, the provision of the edge-compensating structures does not add any surface area to the fingerprint sensor 3.

FIG. 2B is approximately drawn to scale to illustrate a realistic example of relative dimensions of the dielectric structure/protective coating 27, the sensing structures 10 and the ridges 30 and valleys 32 of the finger 26. As can be seen, the dielectric structure/protective coating 28 is rather thick, in order to protect the underlying structures from wear and tear and ESD. Needless to say, the protective coating 28 is important for the robustness of the fingerprint sensor 3. From the relative dimensions in FIG. 2B also follows that the capacitance between sensing structure 10 and finger 26 is very small, especially compared to parasitic capacitances between the sensing structure 10 and other conducting structures adjacent to the sensing structure 10. Examples of such conducting structures include neighboring sensing structures, additional metal structures, the active semiconductor circuitry 29 and the component substrate 27.

An example configuration of the above-mentioned read-out circuitry, including sensing circuits and signal routing and conditioning circuitry will now be described with reference to FIG. 2C, which is a schematic circuit schematic representation of a portion of the fingerprint sensor component in FIG. 2A and FIG. 2B.

Figure 2C:
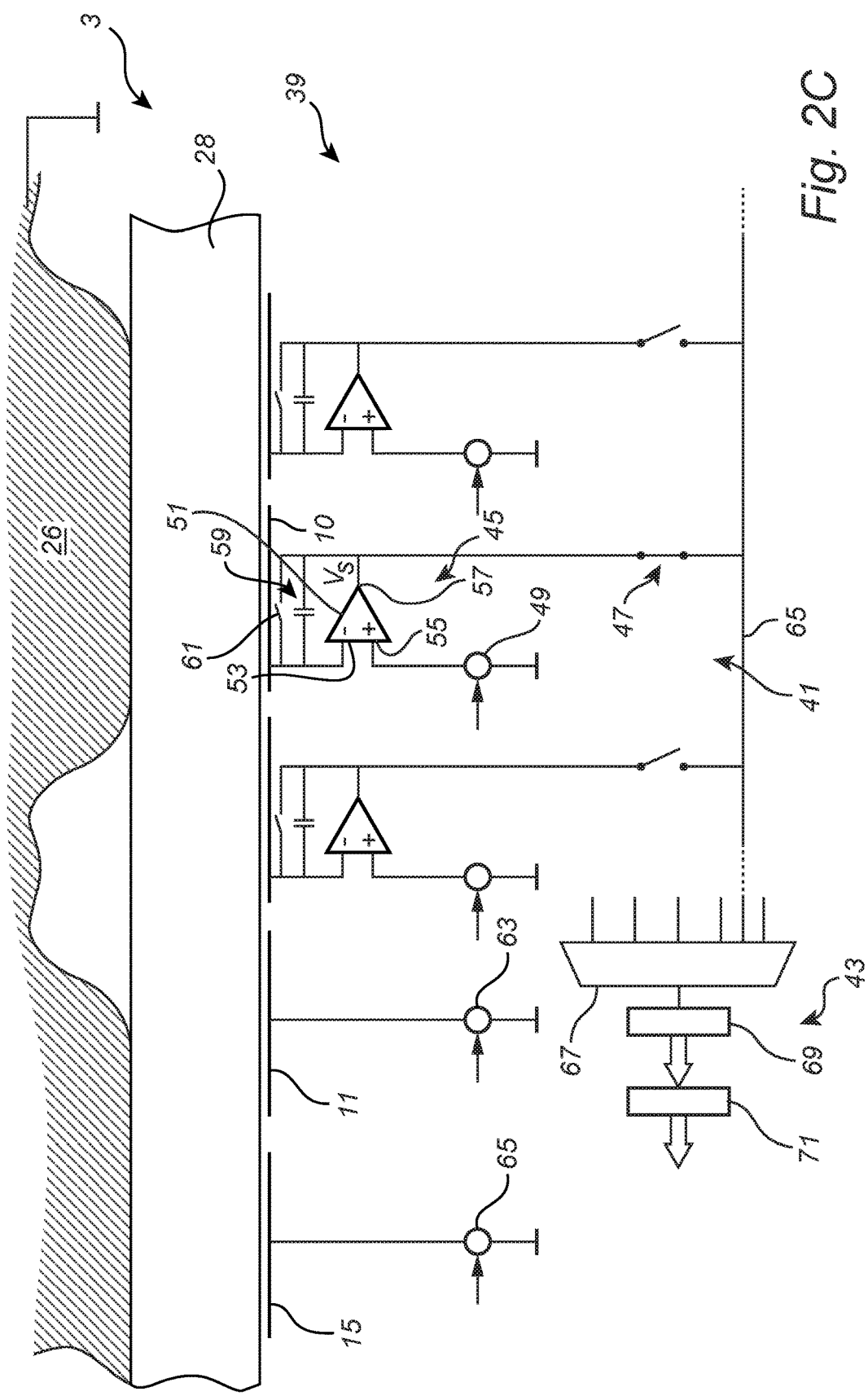
FIG. 2C is a schematic circuit schematic representation of a portion of the fingerprint sensor component in FIG. 2A and FIG. 2B.

As is schematically shown in FIG. 2C, the above-mentioned read-out circuitry 39, which is connected to each sensing structure 10 in the sensor matrix 7, includes sensing circuits 41 and signal routing and conditioning circuitry 43.

Referring to FIG. 2C, each sensing circuit 41 comprises a charge amplifier 45, selection circuitry, here functionally illustrated as a simple selection switch 47 for allowing acquisition of a sensing signal from the sensing circuit 41, and first signal providing circuitry 49 for controllably providing a first time-varying voltage signal $V_1(t)$ to the sensing structure 10 as will be described in greater detail further below.

The charge amplifier 45 comprises at least one amplifier stage, here schematically illustrated as an operational amplifier (op amp) 51 having a first input (negative input) 53 connected to the sensing structure 10, a second input (positive input) 55 connected to the first signal providing circuitry 49, and an output 57. In addition, the charge amplifier 45 comprises a feedback capacitor 59 connected between the first input 53 and the output 57, and reset circuitry, here functionally illustrated as a switch 61, for allowing controllable discharge of the feedback capacitor 59. The charge amplifier 45 may be reset by operating the reset circuitry 61 to discharge the feedback capacitor 59.

As is often the case for an op amp 51, the electrical potential at the first input 53 follows the electrical potential applied to the second input 55. Depending on the particular amplifier configuration, the potential at the first input 53 may be substantially the same as the potential at the second input 55, or there may be a substantially fixed offset between the potential at the first input 53 and the potential at the second input 55.

Using the first signal providing circuitry 49, a first time-varying voltage signal $V_1(t)$, in relation to a reference potential (sensor ground), can be provided to the sensing structure 10.

The first signal providing circuitry 49 may, for instance, be implemented as a number of controllable switches, each being configured to controllably connect the second input 55 to a selected voltage line (being at different voltages in relation to sensor ground). Alternatively, the first signal providing circuitry 49 may be directly connectable to the sensing structure 10, to directly provide the first time-varying voltage signal $V_1(t)$ to the sensing structure 10.

Through control of the first signal providing circuitry 49, the sensing structure 10 can thus be provided with a chosen potential depending on the desired function of the particular sensing structure 10 as will be described in greater detail further below.

Although each sensing circuit 41 is here indicated as being connected to a single respective sensing structure 10, it should be noted that each sensing circuit 41 may alternatively be common to the sensing structures in a group of sensing structures.

As is also schematically indicated in FIG. 2C, the fingerprint sensor 3 comprises second signal providing circuitry 63 and third signal providing circuitry 65. The second signal providing circuitry 63 is connected to the left proximal edge-compensating structure 11 for providing a second time-varying voltage signal $V_2(t)$ to the left proximal edge-compensating structure 11, and the second signal providing circuitry 63 is connected to the left distal edge-compensating structure 15 for providing a third time-varying voltage signal $V_3(t)$ to the left distal edge-compensating structure 15.

When sensing the capacitive coupling between a sensing structure 10 and the finger 26, the first signal providing circuitry 49 is controlled to provide the first time-varying voltage signal $V_1(t)$, in relation to sensor ground, to the second input 55.

In FIG. 2C, the finger 26 is schematically indicated as being "grounded". It should be understood that the finger "ground" may be different from the sensor ground. For instance, the finger 26 may be at the ground potential of the electronic device (such as mobile phone 1 in FIG. 1A or smart card 5 in FIG. 1B) in which the fingerprint sensor 3 is included. Alternatively, the body may be considered to have such a large electrical "mass" that the potential of the finger remains substantially constant when the potential of a sensing structure 10 varies.

The above-described change in potential difference between the sensing structure 10 and the finger 26, results in a sensing signal Vs on the output 57 of the charge amplifier 45.

When the read-out circuitry is controlled to sense the capacitive coupling between a selected sensing structure 10 and the finger 26, the selection switch 47 is closed to connect the output 57 of the charge amplifier 45 to the readout line 65. The readout line 65, which may be a common readout line for a row or a column of the sensor array 7, is shown in FIG. 2C to be connected to a multiplexer 67. As is schematically indicated in FIG. 2C, additional readout lines providing sensing signals from other rows/columns of the fingerprint sensor 3 are also connected to the multiplexer 67.

The sensing signals Vs are demodulated by sample-and-hold circuitry 69. The output of the sample-and-hold circuitry 69 is connected to an analog-to-digital converter 71 for converting the analog DC voltage signals output by the sample-and-hold circuitry 69 to a digital representation of the measurement value for each selected sensing structure 10.

As is schematically indicated in FIG. 2C, the multiplexer 67, the sample-and-hold circuitry 69, and the analog-to-digital converter 71 may be included in the signal routing and conditioning circuitry 43 arranged underneath the edge-compensating structures.

Figure 3:
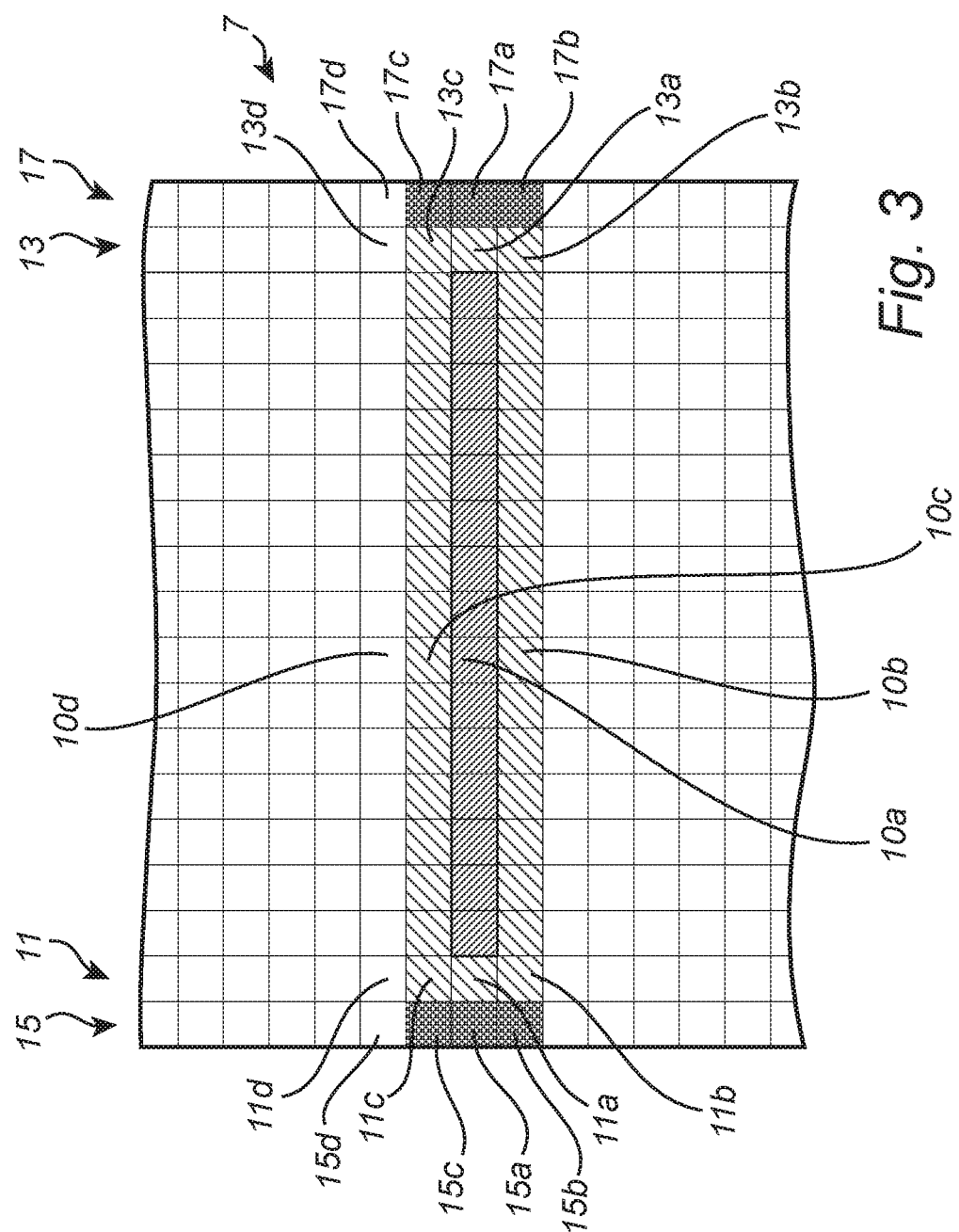
FIG. 3 is a schematic illustration of an example sensing configuration for the fingerprint sensor component in FIGS. 2A-C.

FIG. 3 is a schematic illustration of an example sensing configuration for the fingerprint sensor component in FIGS. 2A-C. In FIG. 3, a simplified sensor array 7 with a very small number of columns is schematically shown. It should be understood that the sensor array 7 in FIG. 3 is only an illustrative example, and that the sensor array 7 may advantageously have a larger number of columns.

In the sensing configuration of FIG. 3, the fingerprint pattern of the finger (not shown in FIG. 3) is sensed row by row ("row" and "column" are interchangeable). The sensing structures 10a in one row are indicated as being used for sensing, and the sensing structures 10b-c in the neighboring rows are indicated as being used for "guarding" to reduce the effect of parasitic capacitive coupling between neighboring sensing structures. In this particular example configuration, the sensing structures 10d outside the band defined by the sensing structures 10a-c in the three indicated rows are held at the sensor ground potential.

In the sensing configuration of FIG. 3, selected edge-compensating structures are used for compensating for the difference in the electrical environment for sensing structures used for sensing close to the edges of the sensor array 7 as compared to sensing structures used for sensing closer to the middle of the sensor array 7. In this particular example three left proximal edge-compensating structures 11a-c, three right proximal edge-compensating structures 13a-c, three left distal edge-compensating structures 15a-c, and three right distal edge-compensating structures 17a-c, are used for compensating the edge effect, as will be described in greater detail further below.

A first example operating scheme for the fingerprint sensor configuration in FIG. 3 will now be described with reference to the schematic timing diagram in FIG. 4A, in addition to, primarily, the illustration in FIG. 2C.

Figure 4A:
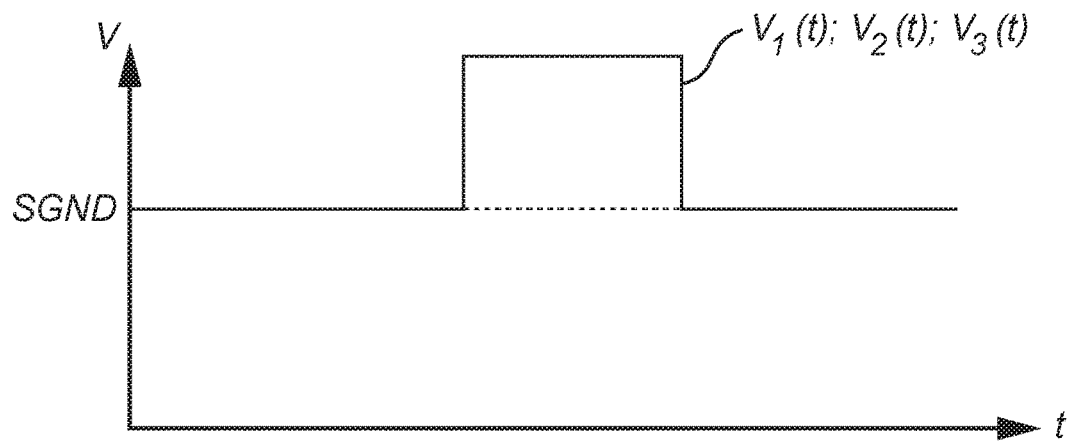
FIG. 4A is a timing diagram schematically illustrating a first example of time-varying voltage signals provided to sensing structures and edge-compensating structures, using the example sensing configuration in FIG. 3.

As is indicated for a simplified sensing operation in FIG. 4A, the first signal providing circuitry 49 is controlled to provide a first time-varying voltage signal $V_1(t)$ to the sensing structures 10a used for sensing the capacitive coupling to the finger and the sensing structures 10b-c used for guarding. Similarly, the second signal providing circuitry 63 is controlled to provide a second time-varying voltage signal $V_2(t)$ to the proximal (left 11a-c, and right 13a-c) edge-compensating structures, and the third signal providing circuitry 65 is controlled to provide a third time-varying voltage signal $V_3(t)$ to the distal (left 15a-c, and right 17a-c) edge-compensating structures. The remaining sensing structures 10d, and edge-compensating structures 11d, 13d, 15d, 17d are all kept at sensor ground (SGND). The sensing circuitry 41 and the signal routing and conditioning circuitry 42 are controlled to sense the capacitive coupling between the sensing structures 10a used for sensing and the finger 26, and to route and condition signals indicative of this capacitive coupling.

In the first example operating scheme of FIG. 4A, the first time-varying voltage signal $V_1(t)$, the second time-varying voltage signal $V_2(t)$, and the third time-varying voltage signal $V_3(t)$ are all substantially identical.

Figure 4B:
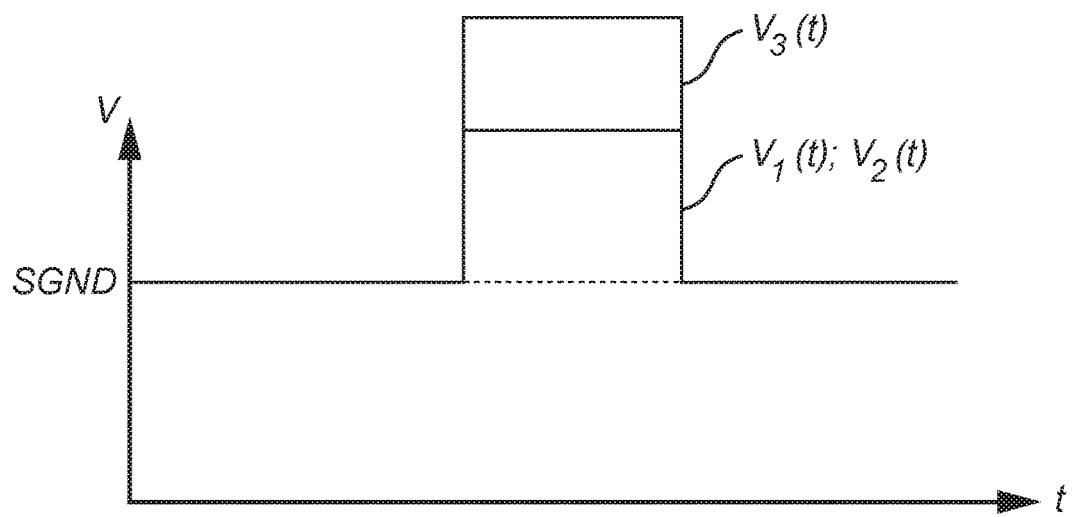
FIG. 4B is a timing diagram schematically illustrating a second example of time-varying voltage signals provided to sensing structures and edge-compensating structures, using the example sensing configuration in FIG. 3.

In the second example operating scheme of FIG. 4B, the first time-varying voltage signal $V_1(t)$ and the second time-varying voltage signal $V_2(t)$ are substantially identical, and the third time-varying voltage signal $V_3(t)$ exhibits a voltage swing that is twice that of the first $V_1(t)$ and second $V_2(t)$ signals.

Figure 5:
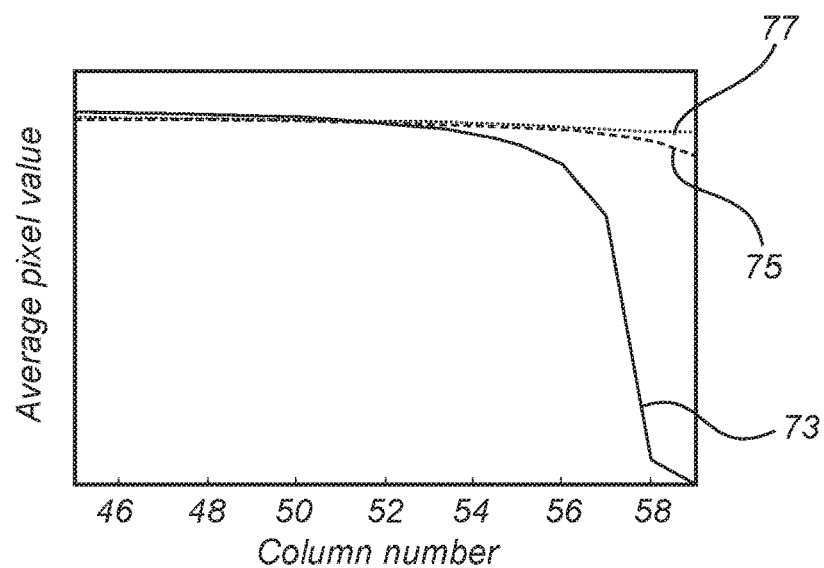
FIG. 5 is a diagram illustrating the effects of the signal configurations in FIGS. 4A-B, respectively, as compared to a fingerprint image acquired without edge compensation.

FIG. 5 is a diagram illustrating the effects of the signal configurations in FIGS. 4A-B, respectively, as compared to a fingerprint image acquired without edge compensation.

The diagram indicates the average pixel values measured for the 14 last columns of a fingerprint sensor 3 according to an embodiment of the present invention for inactive edge-compensating structures (edge-compensating structures kept at sensor ground) (solid line curve 73), the operating scheme of FIG. 4A (dashed line curve 75), and the operating scheme of FIG. 4B (dotted line curve 77).

As can be seen in FIG. 5, pixel values from the sensing structures closest to the edges of the sensor array 7 are clearly different from those from the sensing structures closer to the middle of the sensor array, when edge-compensation is not applied. the operating scheme of FIG. 4A already achieves a significant improvement, which the operating scheme of FIG. 4B can almost completely remove the edge effect.

It should be understood that the actual effect of the edge-compensation will also depend on the other factors, such as the configuration of the dielectric structure 28 between the sensing structures 10 and the finger 26. It should also be noted that further improvements can be achieved by adding additional columns/rows of edge-compensating structures and/or tuning the signals provided to the edge-compensating structures and/or controlling the number and configuration of edge-compensating structures that are provided with voltage signals. Hereby, the edge-compensation can be individually tuned for different applications and/or packaging solutions by controlling/programming one or several of the voltage signals provided to edge-compensating structures, and/or the active configuration (arrangement and/or number) of edge-compensating structures.

Finally, some examples of alternative edge-compensating structure configurations will be briefly described with reference to FIGS. 6A-C.

Figure 6A:
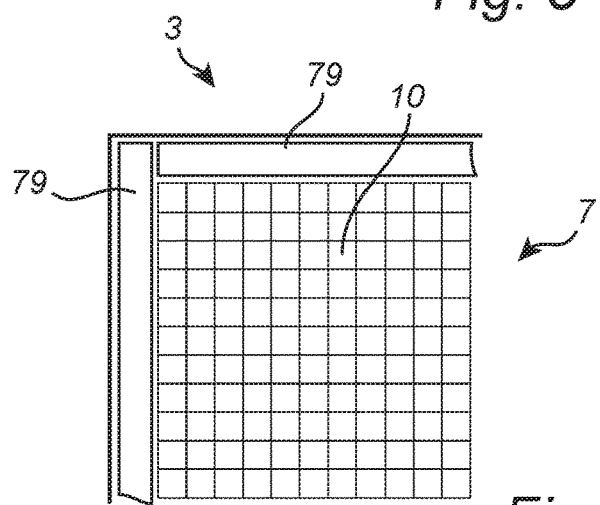
FIGS. 6A-C schematically illustrate examples of alternative edge-compensation structures.

FIG. 6A schematically shows a fingerprint sensor 3 in which individually controllable edge-compensating structures 79 run along the entire length of respective edges of the sensor array 7. The edge-compensating structures 79 may be formed in the same metal layer as the sensing structures 10, or may be added in a post-process, before providing the dielectric structure (protective coating) on the fingerprint sensor 3.

Figure 6B:
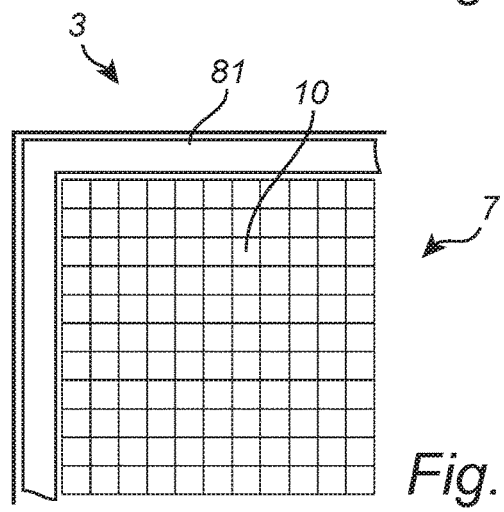

FIG. 6B schematically shows a fingerprint sensor 3 in which a single edge-compensating structure 81 is provided as a frame or bezel around the sensor array 7. As for the configuration in FIG. 6A, the edge-compensating structure 81 may be formed in the same metal layer as the sensing structures 10, or may be added in a post-process, before providing the dielectric structure (protective coating) on the fingerprint sensor 3.

Figure 6C:
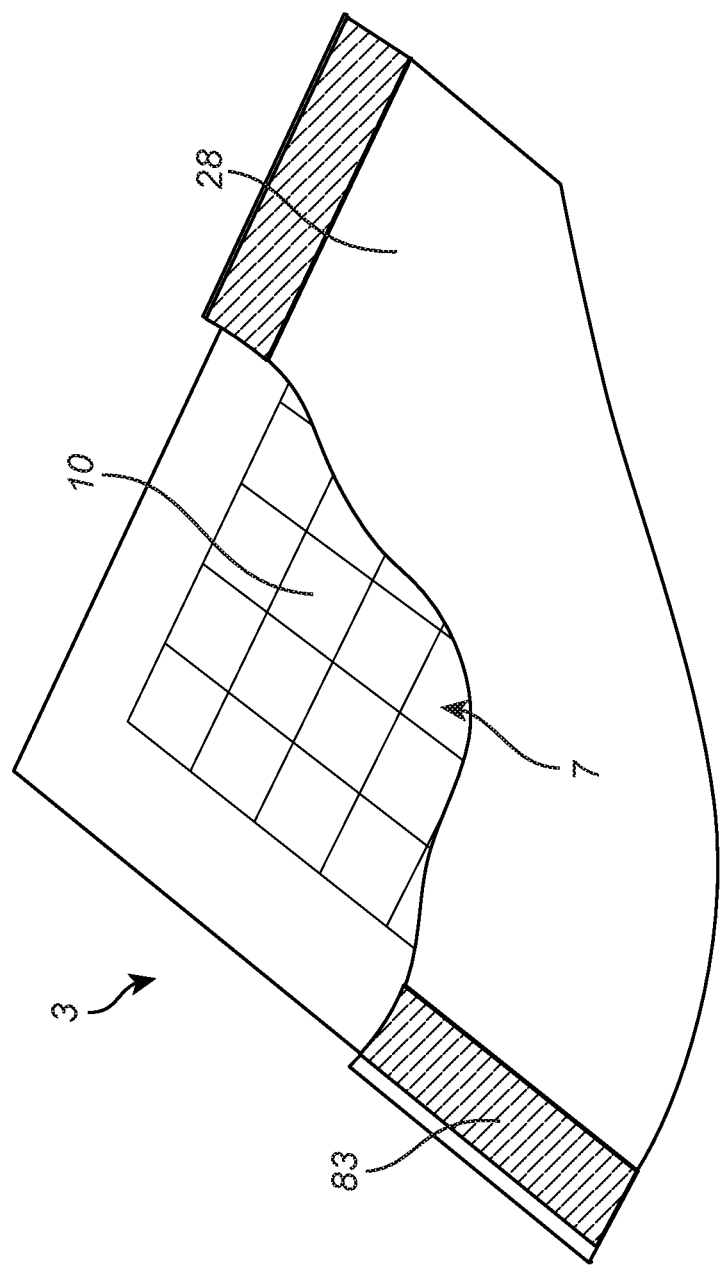

FIG. 6C schematically shows a fingerprint sensor 3 in which an edge-compensating structure 83 is provided as a frame or bezel around the sensor array 7 on top of the dielectric structure (protective coating) on the fingerprint sensor 3.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A fingerprint sensing system for sensing a fingerprint pattern of a finger, comprising:
   a sensor array including a plurality of electrically conductive sensing structures;
   read-out circuitry connected to each of said sensing structures for providing sensing signals indicative of a capacitive coupling between said sensing structures and said finger;
   first signal providing circuitry for providing a first time-varying voltage signal to a set of the sensing structures in the plurality of sensing structures;
   at least one electrically conductive edge-compensating structure arranged outside said sensor array; and
   second signal providing circuitry for providing a second time-varying voltage signal to said at least one edge-compensating structure.

2. The fingerprint sensing system according to claim 1, wherein said second signal providing circuitry is configured to provide said second time-varying voltage signal in synchronization with said first time-varying voltage signal.

3. The fingerprint sensing system according to claim 1, wherein said read-out circuitry comprises:
   a plurality of sensing circuits, each sensing circuit in said plurality of sensing circuits being arranged underneath, and being connected to, a respective set of sensing structures in said plurality of sensing structures; and
   signal routing and conditioning circuitry for routing or conditioning signals to or from said plurality of sensing circuits,
   said signal routing and conditioning circuitry at least partly being arranged underneath said at least one edge compensating structure.

4. The fingerprint sensing system according to claim 1, wherein said sensor array, said read-out circuitry and said at least one edge-compensating structure are included in a fingerprint sensor component.

5. The fingerprint sensing system according to claim 4, wherein said fingerprint sensor component comprises:
   a component substrate;
   active circuitry formed on said component substrate; and
   a plurality of metal layers on said active circuitry.

6. The fingerprint sensing system according to claim 5, wherein said plurality of sensing structures and said at least one edge-compensating structure are formed in a top-most metal layer in said plurality of metal layers.

7. The fingerprint sensing system according to claim 1, wherein:
   the sensing structures in said sensor array are arranged in rows and columns; and
   said fingerprint sensing system comprises a plurality of edge-compensating structures, including:
      a plurality of left proximal edge-compensating structures, each being arranged to the left of a corresponding one of said rows; and
      a plurality of right proximal edge-compensating structures, each being arranged to the right of a corresponding one of said rows.

8. The fingerprint sensing system according to claim 7, wherein said second signal providing circuitry is connected to each of said left proximal edge-compensating structures, and to each of said right proximal edge-compensating structures, and controllable to provide said second time-varying voltage signal to at least one of a set of said left proximal edge-compensating structures and a set of said right proximal edge-compensating structures.

9. The fingerprint sensing system according to claim 8, wherein said second signal providing circuitry is controllable to simultaneously provide said second time-varying voltage signal to at least one of said left proximal edge-compensating structures aligned with one row of sensing structures, and to at least one of said right proximal edge-compensating structures aligned with said row of sensing structures.

10. The fingerprint sensing system according to claim 7, wherein said plurality of edge-compensating structures further includes:
   a plurality of left distal edge-compensating structures, each being arranged to the left of a corresponding one of said left proximal edge-compensating structures; and
   a plurality of right distal edge-compensating structures, each being arranged to the right of a corresponding one of said right proximal edge-compensating structures.

11. The fingerprint sensing system according to claim 10, wherein said second signal providing circuitry is connected to each of said left distal edge-compensating structures, and to each of said right distal edge-compensating structures, and controllable to provide a third time-varying voltage signal to at least one of a set of said left distal edge-compensating structures and a set of said right distal edge-compensating structures.

12. The fingerprint sensing system according to claim 1, wherein said first signal providing circuitry is controllable to provide said first time-varying voltage signal to a set of said sensing structures in said plurality of sensing structures.

13. The fingerprint sensing system according to claim 12, wherein:
   said read-out circuitry comprises a plurality of sensing circuits, each sensing circuit in said plurality of sensing circuit being connected to a respective set of sensing structures in said plurality of sensing structures;
   each sensing circuit in said plurality of sensing circuits comprises a charge amplifier including a first input connected to said set of sensing structures, a second input, an output, a feedback capacitor between said first input and said output, said charge amplifier being configured in such a way that a change in potential at said second input results in a substantially identical change in potential at said first input; and
   said first signal providing circuitry is connected to said second input.

14. The fingerprint sensing system according to claim 13, wherein:
   said fingerprint sensing system comprises a semiconductor substrate;

said charge amplifier comprises a transistor formed in a well in said semiconductor substrate, said transistor having a gate constituting said first input, an interface between said well and said substrate is configured in such a way that current can be prevented from flowing between said well and said substrate; and said first signal providing circuitry is further connected to said well.

15. The fingerprint sensing system according to claim 1, wherein said fingerprint sensing system further comprises:

finger detecting circuitry connected to said at least one edge-compensating structure for providing a finger detection signal indicative of a capacitive coupling between said at least one edge-compensating structure and said finger.

16. A method of sensing a fingerprint pattern of a finger, using a finger sensing system comprising:

a sensor array including a plurality of electrically conductive sensing structures;

read-out circuitry connected to each of said sensing structures;

first signal providing circuitry;

at least one electrically conductive edge-compensating structure arranged outside said sensor array; and second signal providing circuitry, said method comprising the steps of:

controlling said first signal providing circuitry to provide a first time-varying voltage signal to a set of the sensing structures in the plurality of sensing structures;

controlling said second signal providing circuitry to provide a second time-varying voltage signal to said at least one edge-compensating structure; and controlling said read-out circuitry to provide sensing signals indicative of a capacitive coupling between said sensing structures and said finger.

* * * * *